UNITED STATES PATENT OFFICE.

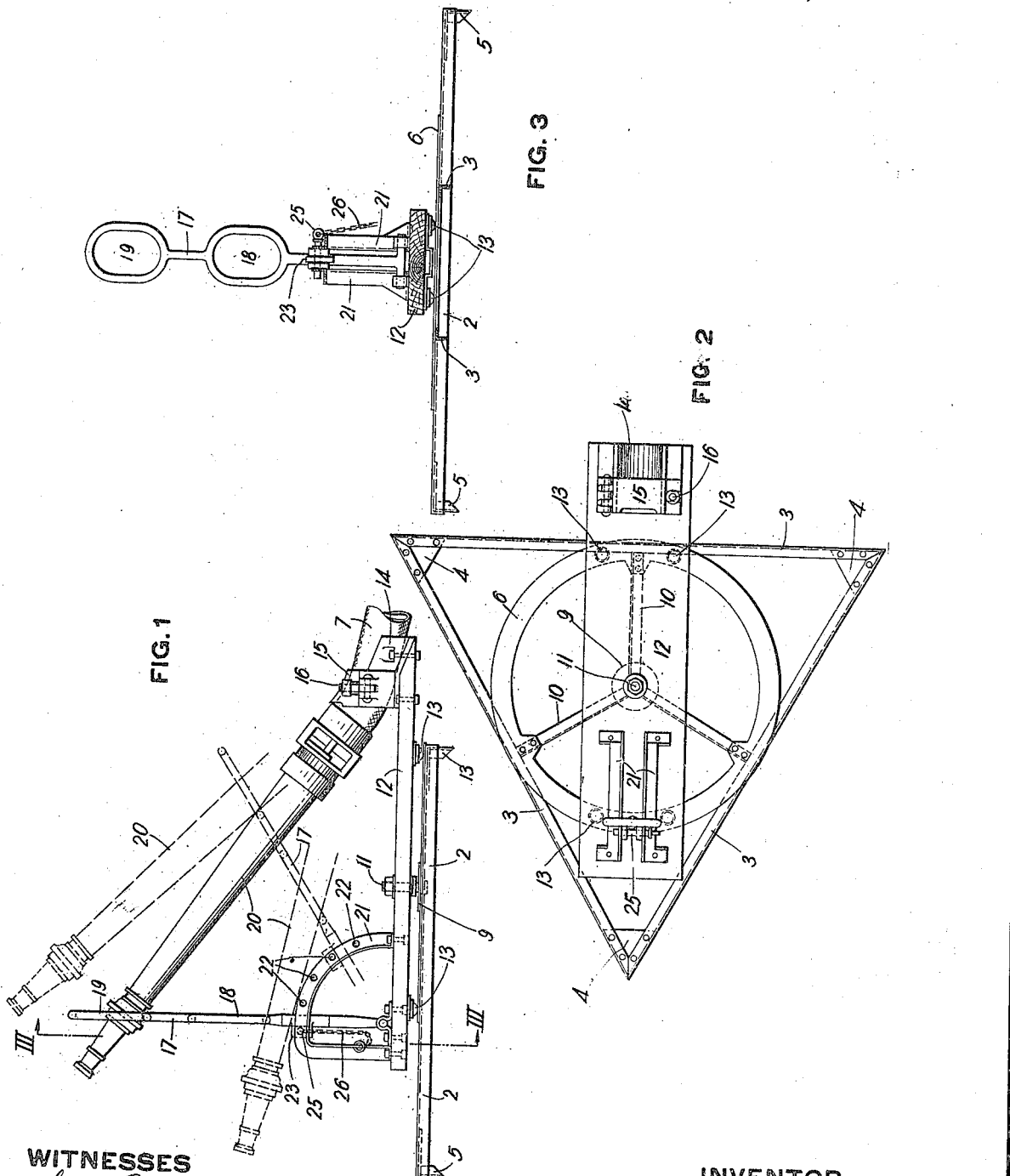

GEORGE DAVIS, OF SHARON, PENNSYLVANIA.

HOSE-NOZZLE SUPPORT.

1,141,106.

Specification of Letters Patent. Patented June 1, 1915.

Application filed December 18, 1913. Serial No. 807,503.

*To all whom it may concern:*

Be it known that I, GEORGE DAVIS, a citizen of the United States, and resident of Sharon, in the county of Mercer and State of Pennsylvania, have invented certain new and useful Improvements in Hose-Nozzle Supports, of which the following is a specification.

My invention has relation to apparatus used in manipulating hose nozzles to regulate the direction of flow of a stream of water issuing from such nozzles, and more particularly related to apparatus used in operating and controlling the direction of flow of water issuing from the hose nozzles of fire fighting apparatus.

One object of my invention is to provide a hose nozzle support having novel means whereby the nozzle of a hose is held in desired angularly adjusted position, and is maintained in position without manual assistance while a stream of water is issuing therefrom.

Another object of my invention is to provide a hose nozzle support having means for holding a nozzle in angularly adjusted position while permitting turning or rotation of the nozzle support and nozzle, to change the course or direction of flow of the stream of water issuing from the nozzle.

Another object of the invention is to provide a hose nozzle support having novel means for angularly adjusting the hose nozzle and holding the nozzle in each of a series of angularly adjusted positions.

Still further objects of my invention will become apparent as the invention is more fully described in the specification and pointed out in the appended claim.

Referring to the drawings forming part of this specification, Figure 1 is a side elevation showing a hose nozzle support constructed and arranged in accordance with my invention. Fig. 2 is a plan of the apparatus shown in Fig. 1. Fig. 3 is a sectional end elevation of the hose nozzle support of Figs. 1 and 2, the section being taken on the line III—III of Fig. 1.

In the accompanying drawings, the numeral 2 designates a base which, as shown, is triangular in outline and is made of rolled metal angles 3 secured at their ends to connection plates 4 by rivets or other suitable fastenings. Extending downwardly at each of the corners of the triangular base are short angles 5 which have pointed lower ends engaging the floor, ground, or other surface on which the base is placed, to assist in holding the base stationary. Fastened to the upper surface of the base 2 is an annular ring forming a track 6 for the bearings on the carrier 12. The base 2 is provided with a center bearing 9 connected by arms 10 to the ring 6 and sides 3 of the base. Pivoted by a pin 11 to the center bearing 9 of the base 2 is a carrier 12, which has the series of four bearings or casters 13 on its under surface, arranged to engage with the circular track 6 formed by the annular ring on the base 2 so that when the carrier 12 is rotated or turned about the pivot pin 11 the bearings 13 will lessen the friction and decrease the power necessary to turn the carrier on the base. Mounted on one end of the carrier 12 is a support 14 for the hose 7 which has a hose clamp 15 hinged thereto, an eye bolt 16 being employed to detachably hold the clamp 15 in clamping position on the support 14. Pivotally secured by one end, on the other end of carrier 12, is a nozzle supporting arm 17, this arm having openings 18—19 therein through one of which the end of the nozzle 20 extends when the apparatus is in use. Fastened by their ends to the carrier 12 are two bent bars forming a quadrant 21 and having a series of registering openings or holes 22 therein. The pivoted arm 17, which extends upwardly between the bars forming the quadrant 21, is provided with a lug or ear 23 having an opening therein which is positioned to register with the series of registering openings or holes 22 in the quadrant 21. A pin 25, which is conveniently secured to the quadrant by means of a short chain 26 or like flexible connection, is employed to enter the registering holes in the quadrant 21 and lug 23 to hold the arm 17 in angularly adjusted position. The nozzle 20 on the end of the hose 7 projects through one or the other of the openings 18—19 in the upper swinging end of the pivoted arm 17 when the hose to which the nozzle 20 is secured is held in position on the carrier 12 by the hose clamp 15.

As will be seen by reference to Fig. 1, the swinging arm 17 is angularly adjustable so as to hold the hose nozzle 20 in any one of a number of angular positions, this arm being movable from the vertical position shown by full lines, into that shown by dotted lines in Fig. 1 and the hose nozzle 20 being held thereby in a series of angularly different positions, ranging between the two extreme positions shown dotted in Fig. 1.

In the operation of my improved apparatus, the hose nozzle support is placed in the desired position, and the nozzle end of the hose 7 is clamped to the support 14 on the carrier by the clamp 15 as shown in the drawings. The pivoted arm 17 is then brought into engagement with the end of the nozzle 20 on the hose 7, the nozzle being caused to extend through one or the other of the openings 18—19 in the swinging end of this swinging arm. The arm 17 is then moved into the angular position necessary to hold the nozzle 7 in the desired angular position required to cause the stream of water to strike the desired location and is fastened in such position by the locking pin 25. When so mounted it will not be necessary to manually hold the hose nozzle when a stream of water under pressure is issuing therefrom. Should it be desired to change the location at which the stream of water strikes, the carrier 12 is readily swung manually about the pivot pin 11 so as to change the direction of the stream of water issuing from the nozzle and the nozzle 7 will remain in any position in which it is moved by turning the carrier 12 on the base 2. The angular position of the nozzle 7 with relation to a horizontal plane is easily and quickly changed, in most cases it only being necessary to move the pivoted arm 17 until the opening in the ear 23 on this arm registers with a different set of the openings 22 in the quadrant 21, re-placing the pin 25 in such registering holes securing the arm 17 and the nozzle 20 in a new angular position.

The advantages of my invention will be apparent to those skilled in the art. The apparatus is simple, is of light weight, and is readily kept in repair. Its weight is such as to make it readily portable, which permits of its being carried from place to place. By its use the difficulties heretofore met with in manipulating the nozzle of fire hose under the high water pressure used with such apparatus, are avoided and overcome.

Modifications in the construction and arrangement of the parts may be made without departing from my invention as defined in the appended claim.

I claim:—

A hose nozzle support comprising a base, a rotary carrier pivoted thereon, parallel quadrants secured on said carrier, said quadrants having a plurality of corresponding holes along their upper sides, a nozzle supporting arm pivoted between and supported laterally by said quadrants, said arm being provided with a lug having a hole therein, and a pin adapted to pass through the hole in said lug and selected holes in said quadrants to secure the arm at different angles.

In testimony whereof, I have hereunto set my hand.

GEORGE DAVIS.

Witnesses:
MARGARET McDONALD,
JOHN FITZPATRICK.